(12) United States Patent
Van Donkelaar et al.

(10) Patent No.: US 7,289,858 B2
(45) Date of Patent: Oct. 30, 2007

(54) LITHOGRAPHIC MOTION CONTROL SYSTEM AND METHOD

(75) Inventors: Edwin Teunis Van Donkelaar, Eindhoven (NL); Petrus Marinus Christianus Maria Van Den Biggelaar, Nuenen (NL)

(73) Assignee: ASML Netherlands B.V., Veldhoven (NL)

( * ) Notice: Subject to any disclaimer, the term of this patent is extended or adjusted under 35 U.S.C. 154(b) by 276 days.

(21) Appl. No.: 10/852,688

(22) Filed: May 25, 2004

(65) Prior Publication Data
US 2005/0267609 A1     Dec. 1, 2005

(51) Int. Cl.
G05B 13/02 (2006.01)
(52) U.S. Cl. ........................................................ 700/45
(58) Field of Classification Search ................. 700/45, 700/28, 29, 30, 31, 44, 55, 78
See application file for complete search history.

(56) References Cited

U.S. PATENT DOCUMENTS

| | | | | |
|---|---|---|---|---|
| 5,229,872 A | * | 7/1993 | Mumola | 349/2 |
| 5,296,891 A | * | 3/1994 | Vogt et al. | 355/67 |
| 5,511,930 A | * | 4/1996 | Sato et al. | 414/676 |
| 5,523,193 A | * | 6/1996 | Nelson | 430/311 |
| 5,969,441 A | * | 10/1999 | Loopstra et al. | 310/12 |
| 6,046,792 A | * | 4/2000 | Van Der Werf et al. | 355/53 |
| 6,470,225 B1 | * | 10/2002 | Yutkowitz | 700/44 |
| 6,577,908 B1 | * | 6/2003 | Wojsznis et al. | 700/42 |
| 6,587,744 B1 | * | 7/2003 | Stoddard et al. | 700/121 |
| 6,961,628 B2 | * | 11/2005 | Yutkowitz | 700/37 |
| 7,006,900 B2 | * | 2/2006 | Zhenduo et al. | 700/299 |
| 2004/0176861 A1 | * | 9/2004 | Butler | 700/63 |

OTHER PUBLICATIONS

Ji-Zheng Chu, Shi-Shang Jang and Yu-Nan Chen, "A Comparative Study of Combined Feedforward/Feedback Model Predictive Control for Nonlinear Systems", 2004, The Canadian Journal of Chemical Engineering.*

* cited by examiner

Primary Examiner—Thomas K. Pham
(74) Attorney, Agent, or Firm—Pillsbury Winthrop Shaw Pittman LLP (57) ABSTRACT

A lithographic apparatus comprising a control system, such as a motion control system, is presented. The control system includes an actuator for moving a moveable part, a feed-forward path from a setpoint input of the control system to the actuator, a feed-back loop, a feed-forward transfer function of the feed-forward path having a feed-forward transfer function part which is an inverse of a part of the actuator transfer function having a stable inverse, the actuator transfer function including a part having a stable inverse and a remainder potentially having an unstable inverse. The setpoint path includes a setpoint delay function, and the feed-forward transfer function further includes a second feed-forward transfer function part. A difference in delay between the setpoint delay function and the second feed-forward transfer function part is equal to a delay of the potentially unstable remainder of the actuator transfer function.

9 Claims, 5 Drawing Sheets

LITHOGRAPHIC MOTION CONTROL SYSTEM AND METHOD

BACKGROUND OF THE INVENTION

1. Field of the Invention

The present invention relates to a lithographic apparatus, a method for controlling a parameter of the lithographic apparatus, a control system and a method for dimensioning a transfer function in such a control system or lithographic apparatus.

2. Description of the Related Art

Lithographic apparatus can be used, for example, in the manufacture of integrated circuits (ICs). In such a case, a patterning device may be used to generate a desired circuit pattern corresponding to an individual layer of the IC, and this pattern can be imaged onto a target portion (e.g. comprising one or more dies) on a substrate (silicon wafer) that has been coated with a layer of radiation-sensitive material (resist).

In general, a single substrate will contain a network of adjacent target portions that are successively exposed. Known lithographic apparatus include so-called steppers, in which each target portion is irradiated by exposing an entire pattern onto the target portion in one go, and so-called scanners, in which each target portion is irradiated by scanning the pattern through the projection beam in a given direction (the "scanning"—direction) while synchronously scanning the substrate parallel or anti-parallel to this direction.

Conventional control systems that control a position of a moveable part of an apparatus, often employ a control configuration that comprises a feed-forward and a feed-back controller. The feed-back, in a form of a feed-back loop, accounts for a high accuracy, a low steady state error and robustness against, for example, product variations and disturbances. The feed-forward accounts for a high speed of the control system and a fast response. Such control systems can be implemented in an analog form, such as, for example, analog electronics.

Alternatively, a part or all of the control system can be implemented in a numeric, i.e., a digital form. The numeric or digital parts can be implemented on a computer, controller or any other suitable numeric device. In an analog implementation a transfer function of the control system (or of parts thereof) can be expressed in the Laplace or s-domain, while in a numeric implementation such transfer function can be expressed in the z-domain.

The control system can be used for controlling any physical quantity, thus not only being limited to a control system for controlling a position of a movable part, however, can also be applied for e.g. a velocity, acceleration, a temperature, a slow, a light intensity, elimination, or any other physical quantity. In a lithographic apparatus, requirements on accuracy as well as on speed of the control system are generally strict. For this reason, a high performance control configuration comprising a feed-forward and a feed-back is frequently applied in a lithographic apparatus.

To obtain an optimal feed-forward, a transfer function of the feed-forward should comprise an inverse of a transfer function of the actuator, which is controlled by the control system. Hence, in the s-domain, if the actuator comprises an integrative transfer function, the feed-forward should comprise a differentiator, while in the z-domain if the actuator comprises a delay, the feed-forward should comprise a time lead thus compensating for the delay.

A problem that arises is that the inverse of the transfer function of the actuator is not always stable. In the s-domain, a pole in the transfer function of the actuator leads to a zero in the transfer function of the feed-forward and vice versa. Thus, if in the s-domain the transfer function of the actuator has a zero in the left half plane, this lead to a pole in the left half plane in the transfer function of the feed-forward. Thus, the transfer function of the feed-forward in the s-domain would be unstable. In a numeric implementation, in the z-domain, if the transfer function of the actuator has a zero which falls outside the unity circle in the z-domain, this will result in a pole outside the unity circle in the transfer function of the feed-forward. Thus, an unstable function of the feed-forward would result.

A known solution to avoid obtaining an unstable feed-forward transfer function in the numeric case, is to mirror the pole in the transfer function of the feed-forward which lies outside the unity circle, into the unity circle. Thus, if a pole in the feed-forward transfer function occurs as $z=-4$ than it is mirrored to $z=-\frac{1}{4}$, thus being mirrored from outside the unity circle into the unity circle hence resulting in a stable transfer function in the feed-forward. A disadvantage of this solution, however, is that by using this mirroring operation, an inaccurate approximation of the feed-forward is created, since the operation, especially the phase performance of the feed-forward, has been changed. Thus, by this mirroring operation, a stable transfer function of the feed-forward is created but at the cost of a decrease in performance of the control system.

Whether or not a transfer function in the z-domain is unstable does not solely depend on the transfer function having a pole outside the unity circle. For example, ratios between a delay time of the actuator (and hence the position of the pole response zero) and a sample time of the numeric system (i.e., the time corresponding to a unity delay) may influence pole instability. Hence, in this application, when reference is made to an unstable pole, this is to be interpreted as also comprising a potentially unstable pole, thus a pole which could become unstable depending on the ratio between the position of the pole and the sample time.

SUMMARY OF THE INVENTION

The principles of the present invention, as embodied and broadly described herein, provide a control system having an accurate feed-forward. In one embodiment, a lithographic apparatus is presented, which comprises a control system for controlling a parameter of a lithographic system. The control system comprises an actuator configured to adjust the parameter, the actuator having an actuator transfer function that comprises a stable inverse part and a potentially unstable inverse part; a feed-forward path comprising a feed-forward controller having a feed-forward controller transfer function, the feed-forward controller transfer function comprising a first part and a second part, the feed-forward controller transfer function first part comprising an inverse of the actuator transfer function stable inverse part; a feed-back loop comprising a feed-back controller, the actuator, and a difference determinator having a difference determinator setpoint input and a difference determinator feed-back input, the difference determinator configured to determine a difference between respective signals at the difference determinator setpoint input and the difference determinator feed-back input; and a setpoint path from the setpoint input to the difference determinator setpoint input, the setpoint path comprising a setpoint delay function. The feed-forward transfer function second part is configured such that a difference in delay between the setpoint delay function and the feed-forward transfer function second part is equal to a delay of the actuator transfer function potentially unstable inverse part.

According to the invention, the transfer function of the actuator is split up into a part which has a stable inverse and a part potentially having an unstable inverse. The part having a stable inverse is included into the feed-forward transfer function. The inventor has had the insight that the remainder of the actuator transfer function, i.e. the potentially unstable remainder, can be expressed in terms of a time delay.

According to the invention, a further expression is added to the feed-forward transfer function and a transfer function is added to the setpoint path, such that a difference in delay between the transfer function in the setpoint path and the further transfer function added to the feed-forward path is equal to a delay of the potentially unstable remainder of the actuator transfer function.

The invention can be applied in a control system comprising a feed-forward and can equally well be applied in a control system comprising a feed-forward as well as a feed-back. According to the invention, the performance of the feed-forward controller will be improved. The invention can be used in the lithographic apparatus e.g. in a position control system to improve servo performance in a wafer stage and a reticle stage.

Due to the improved control system according to the invention, settling time of the stages is reduced. The invention can be applied with any kind of control system, such as a position control system (e.g. for controlling a reticle stage or wafer stage of the lithographic apparatus, for controlling a temperature, an elimination or other light or photon flux related parameter, a temperature, air flow, or any other suitable physical parameter.

In a lithographic apparatus, the effect that the setpoint signal is delayed can be compensated by a time lead in the generation of the setpoint signal, hands any delay in the control system caused by delay of the setpoint signal can be compensated by a time lead in the generation of the setpoint signal.

In the context of this document, the term actuator transfer function does not only refer to the actuator itself, but may also include parts, subsystems of other entities as driven by the actuator, e.g. in an example where the actuator comprises a positioning actuator, the actuator transfer function may also include characteristics of the part movable by the actuator. In particular, dynamic behavior might be largely dependent on the movable part and not only on the characteristics of the actuator as such. Similar considerations also hold for any other type of suitable actuator.

In one embodiment, the setpoint delay function comprises an integer multiple of a sample time of the control system. As a result thereof, a high setpoint accuracy is achieved, as a delay of the setpoint by a time which does not equal an entire multiple of the sample time, which could result in approximation errors if the setpoint consists of an accurate setpoint function such as an accurate setpoint curve, is avoided. As the setpoint delay function only comprises a delay equal to an entire multiple of the sample time, no such approximations of intermediate points on a curve or function are required.

Advantageously, the second feed-forward transfer function part comprises the transfer function of the potentially unstable remainder of the actuator transfer function which has been modified in that a zero thereof being mirrored in a unity circle in a z-domain. Thus, contrary to the state of the art wherein a zero of the potentially unstable part of the actuator transfer function is mirrored into the unity circle and then due to the inversion, appears as a pole in the unity circle in the feed-forward transfer function, according to the embodiment of the invention, the remainder of the transfer function which is potentially unstable is not inverted, but instead, the second feed-forward transfer function part comprises the potentially unstable remainder of the actuator transfer function in a non-inverted form, modified in that the zero is mirrored into the unity circle.

Further, an entire multiple of the sample time of the control system is comprised in the transfer function of the setpoint path, a difference in delay between the setpoint delay function and the second feed-forward transfer function part being equal to the delay of the potentially unstable remainder of the actuator transfer function. As a result, a very accurate control system is created, as the phase errors which occur according to the state of the art by the mirroring operation of the zero of the actuator transfer function (hence according to the state of the art the pole of the feed-forward transfer function) is avoided while a delay introduced into the setpoint path only comprises an entire multiple of the sample time thus avoiding interpolation errors.

As an alternative embodiment, it is possible that the setpoint delay function comprises the transfer function of the potentially unstable remainder of the actuator transfer function, the second feed-forward transfer function part comprising a zero delay. As a result thereof, a more simple, and hence more easy to implement configuration is created, as the second feed-forward transfer function part comprises a zero delay, thus simplifying the feed-forward transfer function, while the setpoint delay function comprises a transfer function identical to the potentially unstable remainder of the actuator transfer function, hence being easy to implement.

In any of the above embodiments, it is possible that the feed-forward path and the setpoint path each comprise a further delay equal to at least one sample time of the motion control system, for making the motion control system causal. Any practical, physical system comprises a time delay, which will result in the feed-forward path into the inverse of a delay, hence in a time lead. To avoid such an anti causal system, unit delays, equal to one or more times the sample time of the control system, are introduced into both the feed-forward path and the setpoint path, thus making the control system causal.

To compensate for the time delay thus introduced, a time lead can be introduced into the setpoint, hence the generation of the setpoint can be shifted in time by an equal amount of sample times. The feed-forward part comprises a first feed-forward transfer function part and a second feed-forward transfer function part. Any of these parts can be anti-causal. The additional unit delays can thus be introduced to compensate for an anti-causality in any of these feed-forward transfer function parts. As the first feed-forward transfer function part has been defined as being an inverse of the stable invertable part of the actuator transfer function, in the context of this document, the delays are thus assumed to comprise in the second feed-forward transfer function part by definition, however can equally well be applied for compensating a time lead in any of the feed-forward transfer function part.

According to a further aspect of the invention, there is provided a method for controlling a parameter of a lithographic apparatus in response to a setpoint signal. The method comprises providing an actuator configured to adjust the parameter, the actuator having an actuator transfer function that comprises a stable inverse part and a potentially unstable inverse part; deriving a feed-forward signal from the setpoint signal via a feed-forward path, the feed-forward path comprising a feed-forward controller having a feed-forward controller transfer function, the feed-forward controller transfer function comprising a first part and a second part, the feed-forward controller transfer function first part comprising an inverse of the actuator transfer function stable inverse part; supplying the feed-forward signal to the actuator; providing a feed-back loop comprising a feed-back controller, the actuator, and a difference determinator having a difference determinator setpoint input and a difference determinator feed-back input; determining a difference between respective signals at the difference determinator setpoint input and the difference determinator feed-back input; supplying the setpoint signal, via a setpoint path, from the setpoint input to the difference determinator setpoint input; delaying the setpoint signal in the setpoint path by a setpoint path delay function; and delaying the feed-forward signal in the feed-forward path by the feed-forward transfer function second part. The feed-forward transfer function second part is configured such that a difference in delay between the setpoint delay function and the feed-forward transfer function second part is equal to a delay of the actuator transfer function potentially unstable inverse part.

The invention further comprises a control system for controlling a parameter of the lithographic apparatus, the control system comprising an actuator configured to adjust the parameter, the actuator having an actuator transfer function that comprises a stable inverse part and a potentially unstable inverse part; a feed-forward path comprising a feed-forward controller having a feed-forward controller transfer function, the feed-forward controller transfer function comprising a first part and a second part, the feed-forward controller transfer function first part comprising an inverse of the actuator transfer function stable inverse part; a feed-back loop comprising a feed-back controller, the actuator, and a difference determinator having a difference determinator setpoint input and a difference determinator feed-back input, the difference determinator configured to determine a difference between respective signals at the difference determinator setpoint input and the difference determinator feed-back input; and a setpoint path from the setpoint input to the difference determinator setpoint input, the setpoint path comprising a setpoint delay function. The feed-forward transfer function second part is configured such that a difference in delay between the setpoint delay function and the feed-forward transfer function second part is equal to a delay of the actuator transfer function potentially unstable inverse part.

The same or similar advantages as achieved with the apparatus according to the invention are also achieved with the method and the control system according to the invention. Also, the same or similar preferred embodiments as described with reference to the apparatus according to the invention, are also applicable to the method and the control system according to the invention, achieving the same or similar effects.

The invention further comprises a method for dimensioning a transfer function of a feed-forward in a control system comprising a feed-forward and a feed-back loop, the method comprising providing a time dependent setpoint signal; measuring a control error of the feed-back loop over time and in response to the setpoint signal; filtering the setpoint signal based on characteristics of the feed-back loop; defining a cost function comprising a difference between the measured control error and a product of the feed-forward transfer function and the setpoint signal; and optimizing parameters of the feed-forward transfer function by applying an optimization algorithm directed to minimizing the cost function with respect to the measured setpoint signal and the measured control error.

With this method, an alternative manner of determining the feed-forward transfer function is provided. In this embodiment, the feed-forward transfer function is determined by performing a plurality of measurements in the time domain, measuring the setpoint signal and the control error of the feed-back loop. With this data, applying the steps as described above, parameters for the feed-forward transfer function are obtained by an optimization operated. The method will be explained in more detail below, making use of an example. The method can be applied in the S-domain as well as in the Z-domain.

In an advantageous embodiment of the method for dimensioning the transfer function, the optimization algorithm comprises an ARX optimization model.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, liquid-crystal displays (LCDs), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist) or a metrology or inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

The terms "radiation" and "beam" used herein encompass all types of electromagnetic radiation, including ultraviolet (UV) radiation (e.g. having a wavelength of 365, 248, 193, 157 or 126 nm) and extreme ultra-violet (EUV) radiation (e.g. having a wavelength in the range of 5-20 nm), as well as particle beams, such as ion beams or electron beams.

The term "patterning device" used herein should be broadly interpreted as referring to means that can be used to impart a projection beam with a pattern in its cross-section such as to create a pattern in a target portion of the substrate. It should be noted that the pattern imparted to the projection beam may not exactly correspond to the desired pattern in the target portion of the substrate. Generally, the pattern imparted to the projection beam will correspond to a particular functional layer in a device being created in the target portion, such as an integrated circuit.

Patterning device may be transmissive or reflective. Examples of patterning device include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions; in this manner, the reflected beam is patterned. In each example of patterning device, the support structure may be a frame or table, for example, which may be fixed or movable as required and which may ensure that the patterning device is at a desired position, for example with respect to the projection system. Any use of the terms "reticle" or "mask" herein may be considered synonymous with the more general term "patterning device".

The term "projection system" used herein should be broadly interpreted as encompassing various types of projection system, including refractive optical systems, reflective optical systems, and catadioptric optical systems, as appropriate for example for the exposure radiation being used, or for other factors such as the use of an immersion fluid or the use of a vacuum. Any use of the term "lens" herein may be considered as synonymous with the more general term "projection system".

The illumination system may also encompass various types of optical components, including refractive, reflective, and catadioptric optical components for directing, shaping, or controlling the projection beam of radiation, and such components may also be referred to below, collectively or singularly, as a "lens".

The lithographic apparatus may be of a type having two (dual stage) or more substrate tables (and/or two or more mask tables). In such "multiple stage" machines the additional tables may be used in parallel, or preparatory steps may be carried out on one or more tables while one or more other tables are being used for exposure.

The lithographic apparatus may also be of a type wherein the substrate is immersed in a liquid having a relatively high refractive index, e.g. water, so as to fill a space between the final element of the projection system and the substrate. Immersion liquids may also be applied to other spaces in the lithographic apparatus, for example, between the mask and the first element of the projection system. Immersion techniques are well known in the art for increasing the numerical aperture of projection systems.

BRIEF DESCRIPTION OF DRAWINGS

Embodiments of the invention will now be described, by way of example only, with reference to the accompanying schematic drawings in which corresponding reference symbols indicate corresponding parts, and in which.

DETAILED DESCRIPTION OF THE INVENTION

Lithographic Apparatus

Figure 1:
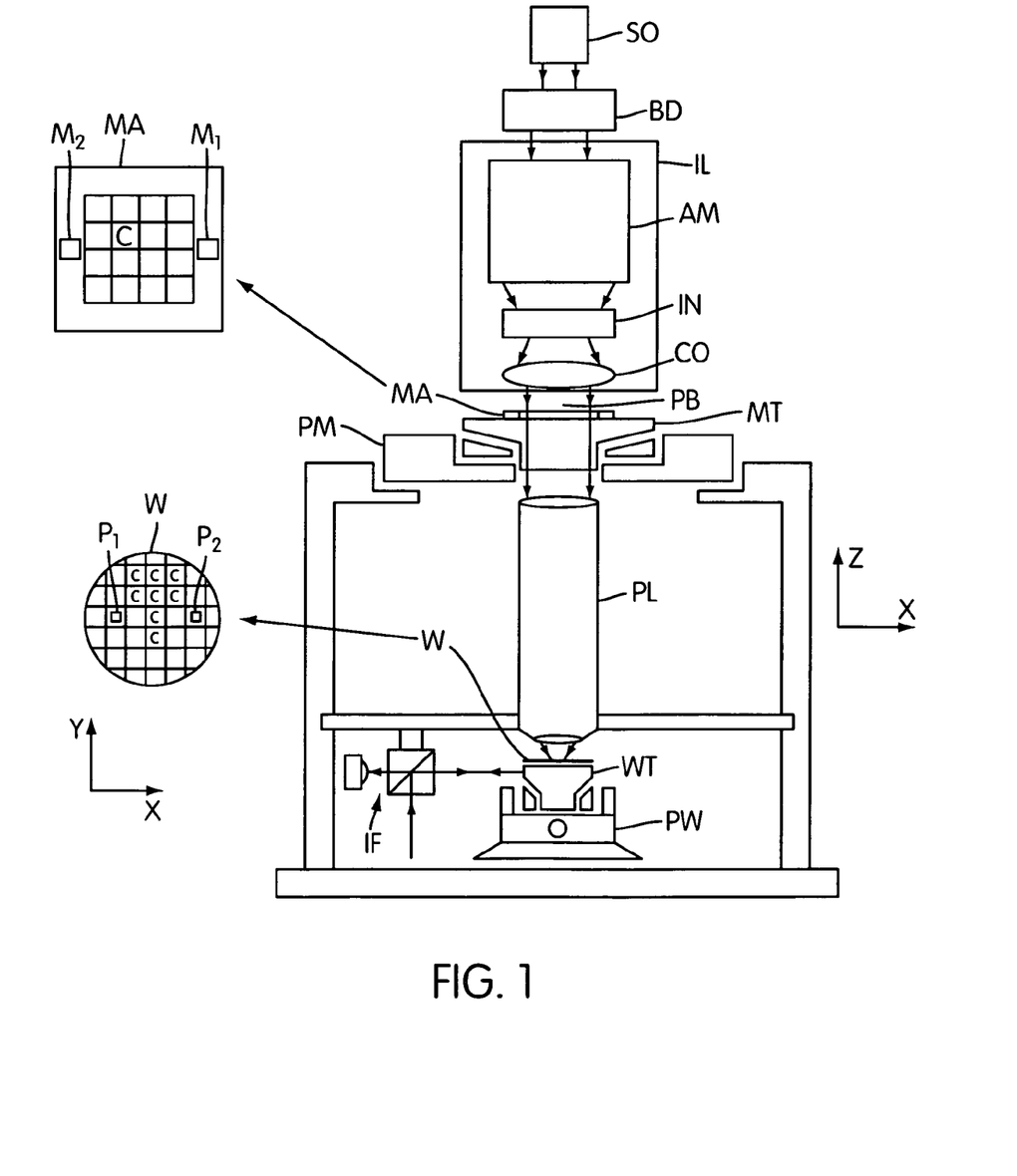
FIG. 1 depicts a lithographic apparatus in which the invention can be embodied.

FIG. 1 schematically depicts a lithographic apparatus according to a particular embodiment of the invention. The apparatus comprises:

an illumination system (illuminator) IL: for providing a projection beam PB of radiation (e.g. UV or EUV radiation).

a first support structure (e.g. a mask table/holder) MT: for supporting patterning device (e.g. a mask) MA and connected to first positioning mechanism PM for accurately positioning the patterning device with respect to item PL;

a substrate table (e.g. a wafer table/holder) WT: for holding a substrate (e.g. a resist-coated wafer) W and connected to second positioning mechanism PW for accurately positioning the substrate with respect to item PL; and a projection system (e.g. a reflective projection lens) PL: for imaging a pattern imparted to the projection beam PB by patterning device MA onto a target portion C (e.g. comprising one or more dies) of the substrate W.

As here depicted, the apparatus is of a transmissive type (e.g. employing a transmissive mask). Alternatively, the apparatus may be of a reflective type (e.g. employing a reflective mask or a programmable mirror array of a type as referred to above).

The illuminator IL receives a beam of radiation from a radiation source SO. The source and the lithographic apparatus may be separate entities, for example when the source is a plasma discharge source. In such cases, the source is not considered to form part of the lithographic apparatus and the radiation beam is generally passed from the source SO to the illuminator IL with the aid of a radiation collector comprising for example suitable collecting mirrors and/or a spectral purity filter. In other cases the source may be integral part of the apparatus, for example when the source is a mercury lamp. The source SO and the illuminator IL, may be referred to as a radiation system.

The illuminator IL may comprise adjusting mechanism for adjusting the angular intensity distribution of the beam. Generally, at least the outer and/or inner radial extent (commonly referred to as σ-outer and σ-inner, respectively) of the intensity distribution in a pupil plane of the illuminator can be adjusted. The illuminator provides a conditioned beam of radiation, referred to as the projection beam PB, having a desired uniformity and intensity distribution in its cross-section.

The projection beam PB is incident on the mask MA, which is held on the mask table MT. Being reflected by the mask MA, the projection beam PB passes through the lens PL, which focuses the beam onto a target portion C of the substrate W. With the aid of the second positioning mechanism PW and position sensor IF2 (e.g. an interferometric device), the substrate table WT can be moved accurately, e.g. so as to position different target portions C in the path of the beam PB. Similarly, the first positioning mechanism PM and position sensor IF1 can be used to accurately position the mask MA with respect to the path of the beam PB, e.g. after mechanical retrieval from a mask library, or during a scan. In general, movement of the object tables MT and WT will be realized with the aid of a long-stroke module and a short-stroke module, which form part of the positioning mechanism PM and PW. However, in the case of a stepper (as opposed to a scanner) the mask table MT may be connected to a short stroke actuator only, or may be fixed. Mask MA and substrate W may be aligned using mask alignment marks M1, M2 and substrate alignment marks P1, P2.

The depicted apparatus can be used in the following preferred modes:

step mode: the mask table MT and the substrate table WT are kept essentially stationary, while an entire pattern imparted to the projection beam is projected onto a target portion C in one go (i.e. a single static exposure).

The substrate table WT is then shifted in the X and/or Y direction so that a different target portion C can be exposed. In step mode, the maximum size of the exposure field limits the size of the target portion C imaged in a single static exposure.

scan mode: the mask table MT and the substrate table WT are scanned synchronously while a pattern imparted to the projection beam is projected onto a target portion C (i.e. a single dynamic exposure). The velocity and direction of the substrate table WT relative to the mask table MT is determined by the (de-)magnification and image reversal characteristics of the projection system PL. In scan mode, the maximum size of the exposure field limits the width (in the non-scanning direction) of the target portion in a single dynamic exposure, whereas the length of the scanning motion determines the height (in the scanning direction) of the target portion.

other mode: the mask table MT is kept essentially stationary holding a programmable patterning device, and the substrate table WT is moved or scanned while a pattern imparted to the projection beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

EMBODIMENTS

Figure 2:
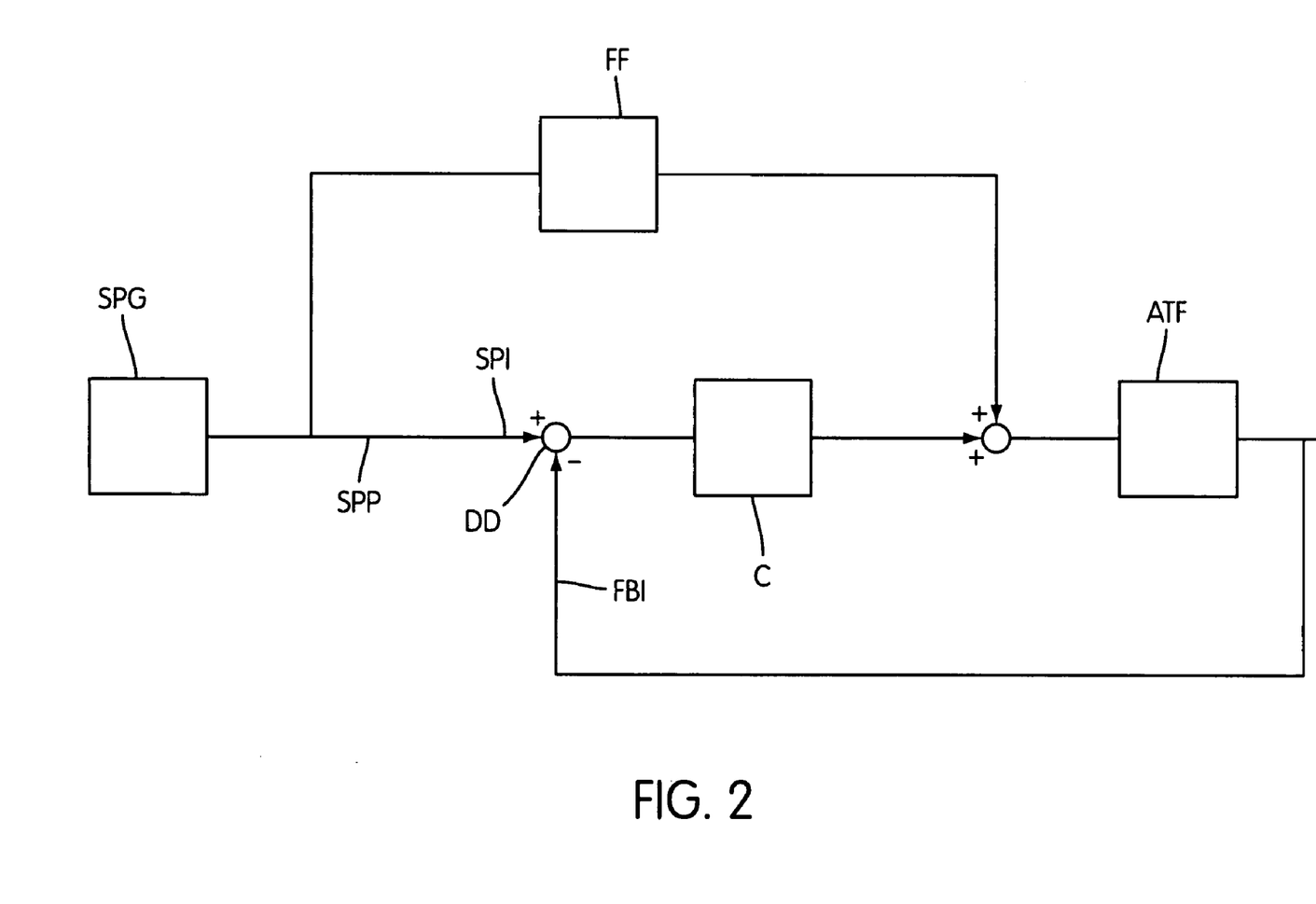
FIG. 2 depicts a control system for use in such a lithographic apparatus.

FIG. 2 depicts a control system comprising a feed-forward and a feed-back loop. A setpoint value or setpoint function is created by a setpoint generator SPG. The parameter or quantity to be controlled, or any quantity derivable therefrom, is controlled by an actuator, expressed in FIG. 2 in terms of an actuator transfer function ATF. A feed-forward path is provided from the setpoint to an input of the actuator transfer function ATF. Further, a feed-back control loop is provided, the loop comprising a controller C the actuator transfer function and a difference determiner for determining a difference between a setpoint input SPI and a feed-back input FBI. The feed-back loop accounts for a high accuracy of the control system. The feed-forward path accounts for a fast response of the control system. A dimensioning of the feed-forward transfer function, in combination with a setpoint delay function in the setpoint path SPP will now be explained with reference to FIG. 3.

Figure 3:
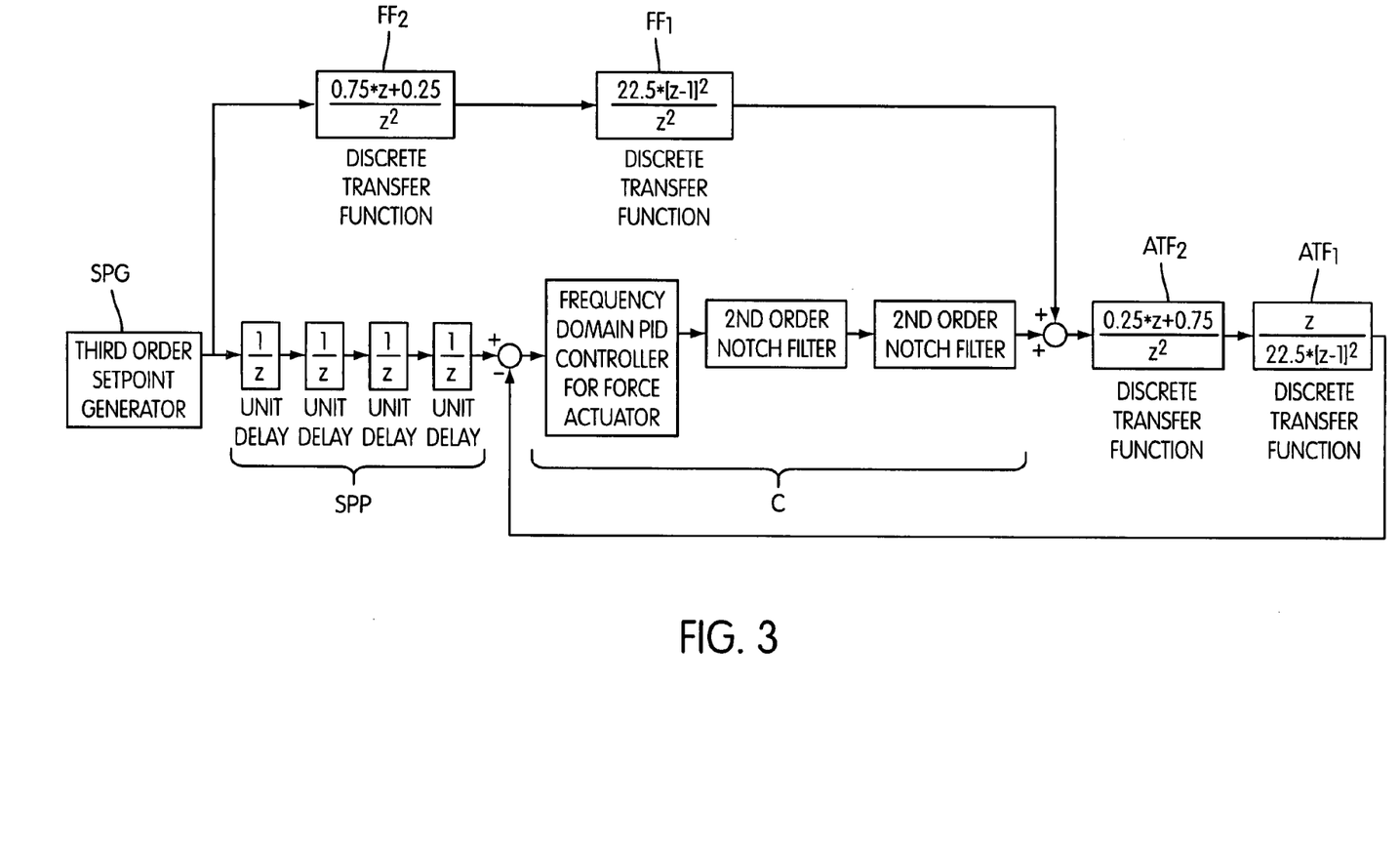
FIG. 3 depicts a control system according to the invention.

FIG. 3 depicts in more detail an embodiment of the feed-forward feed-back control system according to FIG. 2. The actuator transfer function ATF is split up into a part which has a stable inverse ATF1 and a part which potentially has an unstable inverse ATF2. The feed-forward transfer function comprises an inverse of the stably invertable part ATF1, which in FIG. 3 is depicted by FF1, having a transfer function which is an inverse of the transfer function of ATF1. The transfer function ATF2, i.e. the remainder of the actuator transfer function has a zero at z=−3 which is outside the unity circle, hence an inverse of this function would result in a pole at z=−3 thus resulting in a pole outside the unity circle leading to instability.

According to the invention, the zero in ATF2 is mirrored into the unity circle, hence the expression 0.25 z+0.75 is changed into 0.75z+0.25, and such transfer function is included into the feed-forward path, as depicted in FIG. 3 by FF2. Thus, FF2 is not inverted with respect to ATF2, but instead is identical to the zero outside the unity circle being mirrored into the unity circle. Further, according to the invention, a delay is added to the setpoint path SPI. A delay of the transfer function in the setpoint path is chosen such that a difference in delay between the setpoint path delay and the second feed-forward transfer function part FF2 is equal to a delay of the potentially unstable remainder ATF2 of the actuator transfer function. In this example, the delay in the setpoint path thus equals to $z^{-3}$, as an addition of the delay of ATF2 and FF2 amounts to three unity delays.

Further, to make the system causal, a further delay is added to the setpoint path as well as to the feed-forward path which, in the feed-forward path of this example, is included in the feed-forward function FF1. However, it could equally be included in FF2, or in a separate part of the feed-forward transfer function. The delay in the setpoint path does according to the invention not lead to any interpolation or calculation inaccuracy, as the delay in this embodiment amounts to an entire multiple of sample times of the control system.

Figure 4:
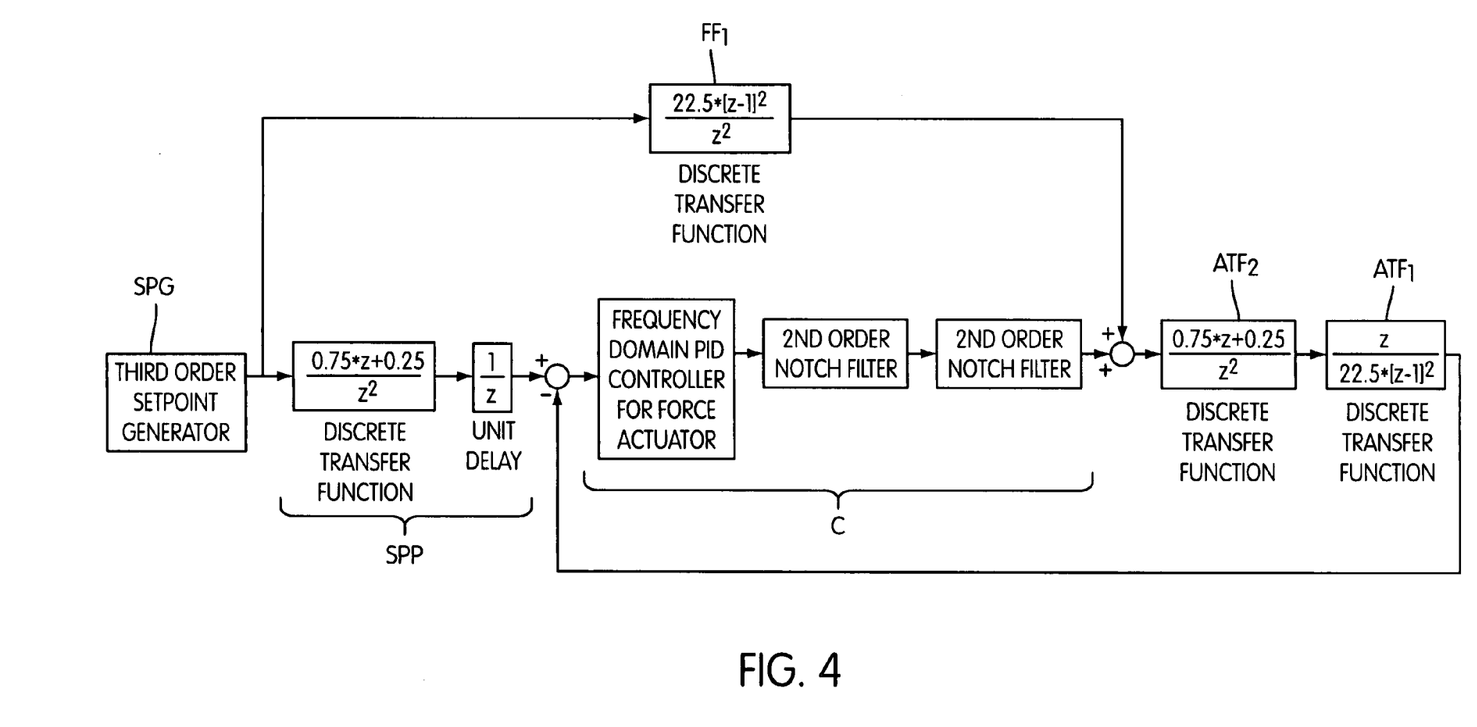
FIG. 4 depicts another embodiment of a control system according to the invention.

FIG. 4 depicts another embodiment of the control system. The stably invertable part of the actuator transfer function ATF1 has been inverted and included into the feed-forward function as depicted by FF1. The potentially unstable remainder of the actuator transfer function ATF2 is according to this embodiment not included into the feed-forward path. Instead, a transfer function equal to the potentially unstable remainder ATF2 of the actuator transfer function is included into the setpoint path SPP. Also in this case, a difference in delay between the delay introduced into the setpoint path (by the function which is identical to ATF2) and the delay of the second feed-forward transfer function part (which in this case is zero, as no further function is included into the feed-forward path except for the inverse of the stably invertable path ATF1) is equal to the delay of the potentially unstable remainder of the actuated transfer function, i.e. ATF2. Thus, in FIG. 4 a simple alternative to the configuration according to FIG. 3 is presented. For causality reasons, an additional unit delay has been added in the setpoint path and in the feed-forward path, as depicted in FIG. 4.

Figure 5:
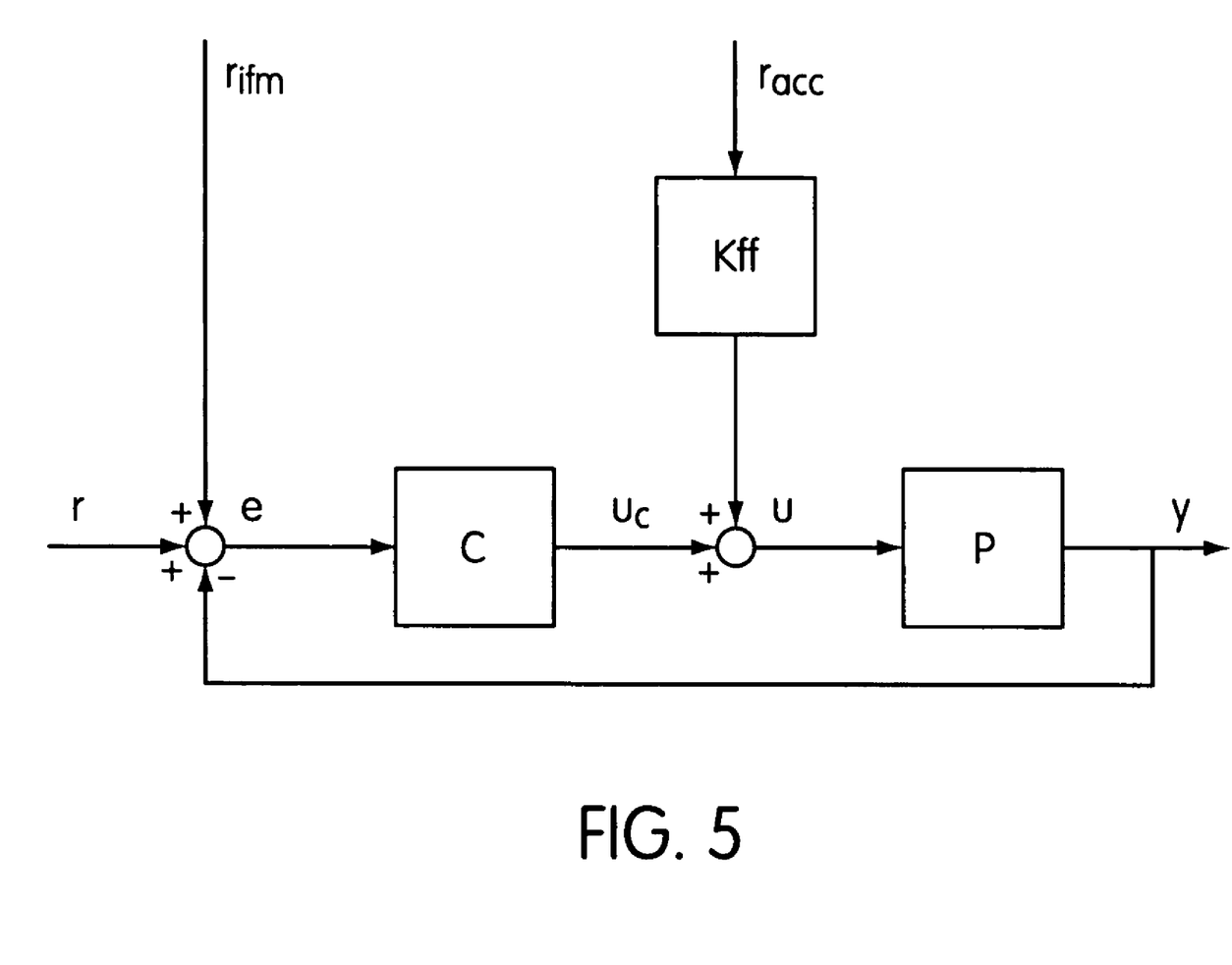
FIG. 5 diagrammatically depicts a feed-forward/feedback control system for explaining the dimensioning method according to the invention.

The control system as depicted in FIG. 5 comprises a system P and a controller C for forming a closed loop control loop and a feed-forward controller $K_{ff}$ for which an optimal transfer is searched for. A setpoint or disturbance signal $r_{ifm}$ is given for which a setpoint or disturbance feed-forward $K_{ff}$ needs to be designed. The signal $r_{ifm}$ need not be measured or even measurable. A measurement is required of another signal $r_{acc}$ which is used to generate a feed-forward signal to counteract the effect of $r_{ifm}$. Because the signal $r_{acc}$ is used to counteract the effect of $r_{ifm}$, the two signals will generally have a relation. In this embodiment a method is described to find an optimal feed-forward controller Kff on the basis of measurement of the control error e(t) and a signal $r_{acc}$ which is used as feed-forward.

In the example below, signal $r_{acc}$ is an acceleration measured with an accelerometer. The measured acceleration is the signal $r_{ifm}$ differentiated twice and filtered with filter A, as indicated by the transfer function $s^2$ A. Addition of the transfer function $s^2$ A to the feed-forward transfer is not required, as this transfer function might also be included in the function Kff. According to the method, measurements are performed of the control error e dependent on time in combination with the accelerometer signal $r_{acc}$ over time. Instead of measuring the accelerometer signal $r_{acc}$, the method is equally well applicable to a measurement of the setpoint signal $r_{ifm}$. It is noted, that in FIG. 5 a further setpoint signal may be provided, which however does not have an influence on the feed-forward and the dimensioning thereof. In the example below, the setpoint signal will thus be indicated as the reference beam signal $r_{ifm}$, a filtered, double differentiated derivative thereof providing an accelerometer signal being referred to as $r_{acc}$.

Assume the following measurement data is available: (a) control error e(t) while lens feed-forward was not active; (b) accelerometer signal $r_{acc}$(t) corresponding with the measurement e(t); and (c) both signals are sampled at a sampling time of Ts and have N samples.

With this information, the control error for a specific feed-forward filter Kff can be predicted, such as, for example, by:

$$d(t)=e(t)-P(1+CP)^{-1} K_{ff} r_{acc}(t)$$

with e(t) and racc(t) measured signals and P a model of the plant and C the feed-back controller used during the experiment. The optimal lens feed-forward is able to minimize this predicted control error ê in some sense.

First, to determine what is "optimal," a cost function is selected. A frequently used cost function with tractable computational properties is given by the sum of squares cost function, which has been referred to as 2-norm of the signal ê(t), and is represented as:

$$V = \sum_{t=t}^{N} d^2(t)$$

Secondly, a filter type has to be determined having certain desired properties and characteristics, such as, for example, order, continuous time or discrete time, linear or nonlinear, etc. This is called the parameterization of the filter. A frequently used parameterization would be an $n^{th}$ order discrete-time filter:

$$K_{ff}(z, \theta) = \frac{n(z)}{d(z)} = \frac{b_o + b_1 z^{-1} + b_2 z^{-2} + \ldots + b_n z^{-n}}{1 + a_1 z^{-1} + a_2 z^{-2} + \ldots + a_n z^{-n}},$$
$$\theta = [b_0 b_1 \ldots b_n a_1 a_2 \ldots a_n]^T$$

The parameters over which is optimized are given in the vector $\theta$. With this parameterization, the cost function may be represented as:

$$V(\theta) = \sum_{t=t}^{N} d^2(t, \theta) = \sum_{t=t}^{N} [e(t) - P(1+CP)^{-1} K_{ff}(\theta) r_{acc}(t)]^2$$

This optimization problem can be viewed as system identification problem for which a lot of theory and tools are available. The setup for the system identification problem is given in the figure below.

The signal $r_{sim}(t)$ can be computed using the measured signal $r_{acc}(t)$ and the controller C and a model of the system dynamics P. The signal d(t) is the error made in the fit. The quadratic cost function can be rewritten as;

$$V(\theta) = \sum_{t=t}^{N} [e(t) - K_{ff}(\theta) r_{sim}(t)]^2 = \sum_{t=t}^{N} d(t, \theta)^2$$

This is simply the sum of squares of the prediction error. This specific method to filter parameters is called prediction-error identification.

In system identification not a feed-forward filter is searched for but a discrete-time model of the system based on input/output data. Nevertheless, we can use the same technique.

There are different possible choices for the representation of the filter.

Representation 1

This representation is simply a numerator/denominator description represented by:

$$e_{sim}(t) = \frac{b_o + b_1 q^{-1} + b_2 q^{-2} + \ldots + b_n q^{-n}}{1 + a_1 q^{-1} + a_2 q^{-2} + \ldots + a_n q^{-n}} r_{sim}(t)$$

where q is the shift operator q x(t)=q(x+1). For discrete-time transfer functions, the z-operator can be replaced by q (see [3] for theoretical details).

In system identification this parameterization is called an output-error model structure. The least-squares optimization problem for this model structure can be performed by simulation methods, such as, Matlab. The parameters in the denominator make the cost function nonlinear, therefore a nonlinear optimization has to be performed. With a sensible initial parameter vector, good models can be obtained. However, implementation in test software may be problematic, as writing effective nonlinear optimization code may become expensive.

Representation 2

This representation is the so-called ARX model structure given by:

$$(1+a_1 q^{-1}+a_2 q^{-2}+\ldots+a_n q^{-n})e_{sim}(t)=(b_o+b_1 q^{-1}+b_2 q^{-2}+\ldots+b_n q^{-n})r_{sim}(t)$$

The advantage of this representation is that the prediction error d(t) is linear in the parameters. This can be seen as follows $$e_{sim}(t) = -(a_1 q^{-1} + a_2 q^{-2} + \ldots + a_n q^{-n})e_{sim}(t) +$$
$$(b_o + b_1 q^{-1} + b_2 q^{-2} + \ldots + b_n q^{-n})r_{sim}(t)$$
$$= [r_{sim}(t) r_{sim}(t-1) \ldots r_{sim}(t-n) -$$
$$e_{sim}(t-1) \ldots - e_{sim}(t-1)]$$
$$[b_0 b_1 \ldots b_n a_1 a_2 \ldots a_n]^T$$
$$= \varphi T(t)\theta$$

Because the prediction error is linear in the parameter vector, a quadratic cost function is quadratic in the parameters:

$$V(\theta) = \sum_{t=t}^{N} d^2(t) = \sum_{t=t}^{N} [e(t) - K_{ff}(\theta)r_{sim}(t)]^2 = \sum_{t=t}^{N} [e(t) - \varphi^T(t)\theta]^2$$

A quadratic function has a (under mild conditions) a unique minimum that can be calculated analytically. The computation can be written in matrix notation as follows:

$$\underbrace{\begin{bmatrix} d(1) \\ d(2) \\ \vdots \\ \vdots \\ d(N) \end{bmatrix}}_{D} = \underbrace{\begin{bmatrix} e(1) \\ \vdots \\ e(N) \end{bmatrix}}_{E} -$$

$$\underbrace{\begin{bmatrix} r_{sim}(1) & \cdots & r_{sim}(1-n) & -e_{sim}(0) & \cdots & -e_{sim}(1-n) \\ r_{sim}(2) & \cdots & r_{sim}(1) & -e_{sim}(1) & & \\ \vdots & & \vdots & & \ddots & \\ r_{sim}(N) & \cdots & r_{sim}(N-n) & -e_{sim}(N-1) & \cdots & -e_{sim}(N-n) \end{bmatrix}}_{\Phi} \underbrace{\begin{bmatrix} b_0 \\ \vdots \\ b_n \\ a_1 \\ \vdots \\ a_n \end{bmatrix}}_{\theta}$$

Because the measured signals are available from t=1 to N, usually the first n rows of the matrix $\Phi$ are discarded. The cost function can now be written as follows:

$$V(\theta) = \sum_{t=t}^{N} d^2(t) = D^T D = (E - \Phi\theta)^T (E - \Phi\theta)$$

The cost function is quadratic in $\theta$ therefore the solution can be obtained analytically:

$$V(\theta) = \sum_{t=t}^{N} d^2(t) = D^T D$$
$$= (E - \Phi\theta)^T (E - \Phi\theta)$$
$$= \theta^T (\Phi^T \Phi)\theta - 2E^T \Phi\theta + E^T E$$

The minimum of this cost function can be obtain by setting the derivative of the cost function to zero, such as, for example:

$$\frac{dV(\theta)}{d\theta} = 2(\Phi^T \Phi)\theta - 2E^T \Phi\theta = 0$$

the optimal parameter vector is therefore given by:

$$\theta_{optimal} = (\Phi^T \Phi)^{-1} \Phi^T E$$

Note that this solution is equal to the least squares solution of the overdetermined set of equations $$E = \Phi\theta$$

This can be solved, for example, using simulation methods, such as, Matlab, by using certain identification features. Because of the simplicity of the optimization ARX model estimation is a powerful tool to find optimal filters that can also be implemented by test software.

Extensions & Modifications

There are possible extensions and modifications to the embodiments described above. For example, to increase the quality of the fit in certain frequency areas the input and output signals can be filtered. If, e.g. a Butterworth filter with cut-off frequency 500 Hz is used, the quality of the fit up to 500 Hz is improved at the cost of the fit for higher frequencies.

Data of several experiments can be combined. Standstill data, data with reticle stage and/or wafer stage scanning can be combined to improve the quality of the fit.

The ARX model can also be calculated on-line with a recursive least-squares algorithm. The algorithm proposed in the previous section consists of the following steps:

Step 1: measure the control error e(t) and the accelerometer signal $r_{acc}(t)$ with lens feed-forward off. In this experiment, it is important to get a good excitation of the lens e.g. by excitation of the airmounts as is used in [1]. Also several experiments with different excitation can be performed which can be combined in the identification of the filter in Step 3.

Step 2: Filter the accelerometer signal with a model of the process sensitivity to get the signal: $r_{sim}(t) = P(1+CP)^{-1} r_{acc}(t)$; where P is a model of the process and C is the controller.

Step 3: Identify a filter $K_{ff}$ between $r_{sim}(t)$ and the measurement e(t) such that $[e(t) - K_{ff} r_{sim}(t)]$ is as small as possible. This can be done using standard least squares system identification techniques. In these techniques, the least squares cost function are minimized by:

$$V(\theta) = \sum_{t=t}^{N} [e(t) - K_{ff}(\theta)r_{sim}(t)]^2$$

The parameterization of the filter Kff is to be selected. If a numerator/denominator characterization is chosen, a non-linear optimization is required. This can be done in Matlab but may be more difficult to program in test software. If ARX parameterization is selected, the least squares problem is to be solved which can be easily implemented in test software.

Step 4: The identified filters are discrete time transfers. If only continuous time filters can be implemented, a conversion to continuous time is required.

The control system and method according to the invention can be implemented in software as well as in hardware or any combination thereof. The control system and method can e.g. be implemented as software instructions running on a programmable device, such as a microprocessor, microcontroller or digital signal processor, or any other suitable processing device, can be programmed into a programmable integrated circuit, or can be implemented in discrete or integrated hardware, such as an application specific integrated circuit.

Thus, while specific embodiments of the invention have been described above, it will be appreciated that the invention may be practiced otherwise than as described. As such, the description is not intended to limit the invention. The configuration, operation, and behavior of the present invention has been described with the understanding that modifications and variations of the embodiments are possible, given the level of detail present herein. Thus, the preceding detailed description is not meant or intended to, in any way, limit the invention—rather the scope of the invention is defined by the appended claims.

What is claimed is:

1. A lithographic apparatus, comprising:
a control system configured to control a parameter of the lithographic apparatus, said control system comprising:
an actuator configured to adjust said parameter, said actuator having an actuator transfer function that comprises a stable inverse part and a remainder comprising a potentially unstable inverse part;
a feed-forward path comprising a feed-forward controller having a feed-forward controller transfer function, said feed-forward controller transfer function comprising a first part and a second part, said feed-forward controller transfer function first part comprising an inverse of said actuator transfer function stable inverse part;
a feed-back loop comprising a feed-back controller, said actuator, and a difference determinator having a difference determinator setpoint input and a difference determinator feed-back input, said difference determinator configured to determine a difference between respective signals at the difference determinator setpoint input and the difference determinator feed-back input; and
a setpoint path from a setpoint input to the difference determinator setpoint input, said setpoint path comprising a setpoint delay function,
wherein a difference in delay between the setpoint delay function and said feed-forward controller transfer function second part is equal to a delay of said potentially unstable remainder of the actuator transfer function.

2. The lithographic apparatus of claim 1, wherein the setpoint delay function comprises an integer multiple of a sample time of the control system.

3. The lithographic apparatus of claim 2, wherein said feed-forward controller transfer function second part comprises said actuator transfer function potentially unstable inverse part which has been modified so that it contains a zero mirrored in a unity circle in a z-domain.

4. The lithographic apparatus of claim 1, wherein said setpoint delay function comprises said actuator transfer function potentially unstable inverse part and said feed-forward controller transfer function second part comprises a zero delay.

5. The lithographic apparatus of claim 1, wherein said feed-forward path and said setpoint path each comprise a further delay equal to at least one sample time of the control system to make the control system causal.

6. A method for controlling a parameter of a lithographic apparatus in response to a setpoint signal, said method comprising:
providing an actuator configured to adjust said parameter, said actuator having an actuator transfer function that comprises a stable inverse part and a remainder comprising a potentially unstable inverse part;
deriving a feed-forward signal from the setpoint signal via a feed-forward path, said feed-forward path comprising a feed-forward controller having a feed-forward controller transfer function, said feed-forward controller transfer function comprising a first part and a second part, said feed-forward controller transfer function first part comprising an inverse of said actuator transfer function stable inverse part;
supplying said feed-forward signal to said actuator;
providing a feed-back loop comprising a feed-back controller, said actuator, and a difference determinator having a difference determinator setpoint input and a difference determinator feed-back input;
determining a difference between respective signals at said difference determinator setpoint input and said difference determinator feed-back input;
supplying said setpoint signal, via a setpoint path, from a setpoint input to said difference determinator setpoint input;
delaying said setpoint signal in said setpoint path by a setpoint path delay function; and
delaying said feed-forward signal in said feed-forward path by said feed-forward controller transfer function second part,
wherein a difference in delay between said setpoint delay function and said feed-forward controller transfer function second part is equal to a delay of said potentially unstable remainder of the actuator transfer function.

7. A control system for controlling a parameter, comprising:
an actuator configured to adjust said parameter, said actuator having an actuator transfer function that comprises a stable inverse part and a remainder comprising a potentially unstable inverse part;
a feed-forward path comprising a feed-forward controller having a feed-forward controller transfer function, said feed-forward controller transfer function comprising a first part and a second part, said feed-forward controller transfer function first part comprising an inverse of said actuator transfer function stable inverse part;
a feed-back loop comprising a feed-back controller, said actuator, and a difference determinator having a difference determinator setpoint input and a difference determinator feed-back input, said difference determinator configured to determine a difference between respective signals at the difference determinator setpoint input and the difference determinator feed-back input; and
a setpoint path from a setpoint input to the difference determinator setpoint input, said setpoint path comprising a setpoint delay function,
wherein a difference in delay between the setpoint delay function and said feed-forward controller transfer function second part is equal to a delay of said potentially unstable remainder of the actuator transfer function.

8. A method for dimensioning a transfer function of a feed-forward path in a control system comprising a feed-forward and a feed-back loop, said method comprising:
providing a time dependent setpoint signal;
measuring a control error of said feed-back loop over time and in response to said setpoint signal;
filtering said setpoint signal based on characteristics of said feed-back loop;
defining a cost function comprising a difference between the measured control error and a product of said feed-forward transfer function and said setpoint signal; and
optimizing parameters of said feed-forward transfer function by applying an optimization algorithm directed to minimizing the cost function with respect to said setpoint signal and the measured control error.

9. The method of claim 8, wherein said optimization algorithm comprises an ARX optimization model.

* * * * *